Oct. 20, 1931.  A. A. PEARCE  1,828,615
COTTON CHOPPER
Filed Nov. 1, 1930  3 Sheets-Sheet 1

A. A. Pearce, INVENTOR
BY Victor J. Evans
ATTORNEY

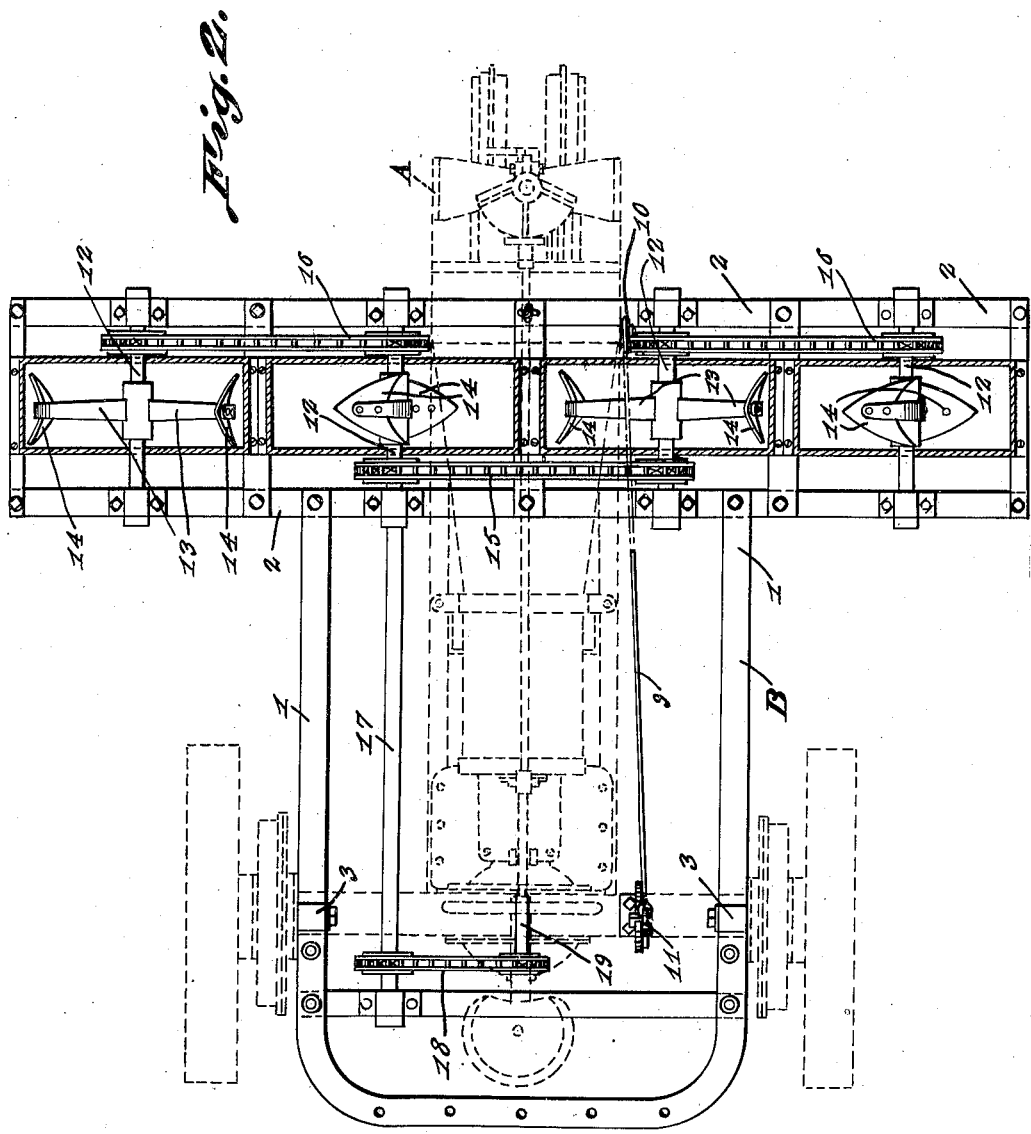

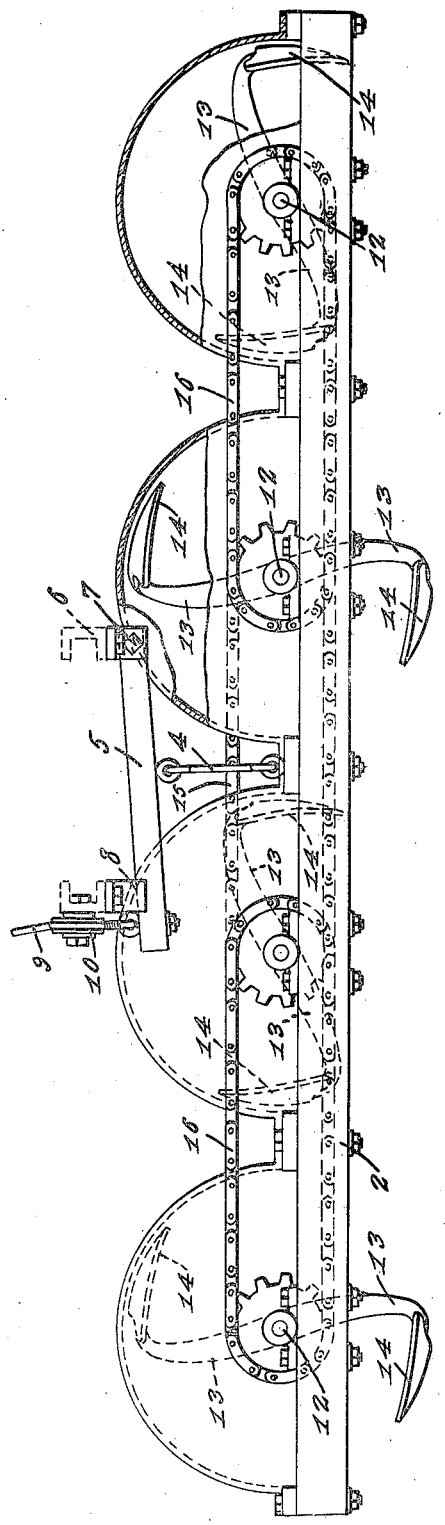

Patented Oct. 20, 1931

1,828,615

UNITED STATES PATENT OFFICE

ALLEN A. PEARCE, OF BEEVILLE, TEXAS

COTTON CHOPPER

Application filed November 1, 1930. Serial No. 492,843.

This invention relates to a cotton chopper, the general object of the invention being to provide means for attaching a frame to a tractor, the frame carrying a transverse row of shafts to which the choppers are connected, with means for rotating the shafts from the tractor and with means for raising and lowering the front part of the frame to adjust the choppers toward and away from the ground, thus providing means for chopping plants from a number of rows of plants so that the work can be done much quicker than when done by hand.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a top plan view of Figure 1, with parts in section.

Figure 3 is a view of a shaft carrying part of the frame and showing the choppers, the driving means therefor and the casings for the choppers and also the means for adjustably connecting the frame with a part of the tractor.

Figure 1:
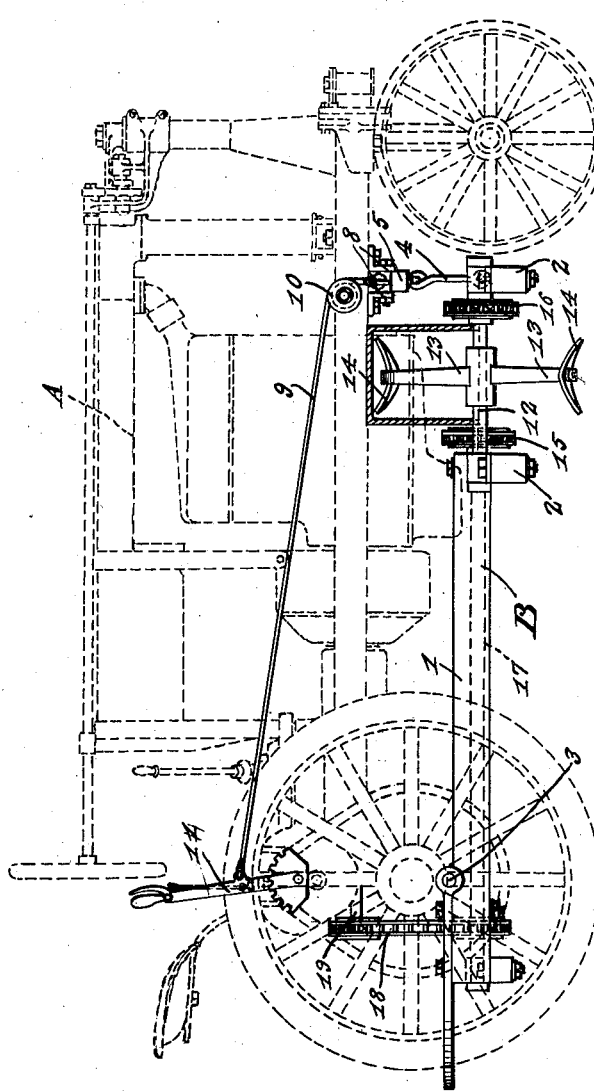
Figure 1 is an elevation, with parts in section, showing the invention applied to a tractor.

In these drawings, the letter A indicates the tractor and the letter B indicates a frame which is composed of the substantially U-shaped part 1 and the elongated transverse part 2, the rear side piece of which is connected to the front ends of the part 1 and this part 1 is pivotally connected with parts of the tractor, as shown at 3, so that it can swing about a horizontal axis, the pivotal points 3 being located an appreciable distance from the rear end of the frame part 1.

The front member of the frame part 2 is connected by a link 4 with the central part of a lever 5 which is pivoted at one end to a side bar 6 of the tractor, as shown at 7, a pair of ears 8 connected with the other side bar being adapted to receive the other end of the lever between them. A cable 9 is connected with the free end of the lever and passes over a pulley 10 and extends rearwardly, where it is connected to a hand lever 11 arranged adjacent the seat of the tractor so that the operator, by manipulating this lever, can raise and lower the front part of the frame B.

A plurality of shafts 12 is journaled in the frame part 2 and each shaft carries a pair of arms 13 to which the choppers 14 are connected. The central pair of shafts 2 is connected together by the chain and sprockets, shown generally at 15, and each of these shafts is connected with an outer shaft by the chain and sprockets, shown generally at 16. One of the central shafts is extended, as shown at 17, and the rear end of this extended part is connected by the chain and sprockets, shown generally at 18, with a shaft 19 which is driven from the engine of the tractor.

From the foregoing it will be seen that all the shafts 12, with the choppers thereon, are rotated from the engine of the tractor so that a number of rows of plants will be thinned as the tractor travels along. The drawings show four of the chopper carrying shafts so that in this case four rows of plants will be acted on at one time. The operator, by manipulating the lever 11, can adjust the choppers toward and from the ground and by swinging the frame upwardly to its fullest extent, the choppers will be moved well above the ground so that the device can be transported from place to place without the choppers contacting the ground or objects thereon.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a tractor, a frame comprising a rear part and a transversely arranged front part, means for pivotally connecting the rear part to the rear part of the tractor, a plurality of shafts journaled in the transverse part, choppers carried by the shafts, means for rotating one of the shafts from the engine of the tractor, means for communicating the movement of this shaft to the other shafts and means for adjusting the front part of the frame toward and away from the ground.

2. In combination with a tractor, a frame comprising a rear part and a transversely arranged front part, means for pivotally connecting the rear part to the rear part of the tractor, a plurality of shafts journaled in the transverse part, choppers carried by the shafts, means for rotating one of the shafts from the engine of the tractor, means for communicating the movement of this shaft to the other shaft, means for adjusting the front part of the frame toward and away from the ground, such means comprising a lever pivoted to a part of the tractor, a link connecting the central part of the lever to the front part of the transverse portion of the frame, a hand lever arranged adjacent the driver's seat of the tractor and a cable connecting the hand lever with the free end of the lever.

In testimony whereof I affix my signature.

ALLEN A. PEARCE.